United States Patent [19]

Valo

[11] 4,245,735
[45] Jan. 20, 1981

[54] DEVICE FOR PORTIONING LOGS OR SIMILAR OBJECTS

[76] Inventor: Antti T. Valo, PL 29, 08101 Lohja 10, Finland

[21] Appl. No.: 104,933

[22] Filed: Dec. 18, 1979

[30] Foreign Application Priority Data

Feb. 13, 1979 [FI] Finland ............................ 790473

[51] Int. Cl.³ ...................... B65G 37/00; B65G 47/04
[52] U.S. Cl. ................................. 198/492; 198/530; 414/748
[58] Field of Search ............... 198/491, 492, 443, 530, 198/532; 414/745, 748; 221/237, 298, 251

[56] References Cited

U.S. PATENT DOCUMENTS

| | | | |
|---|---|---|---|
| 2,609,942 | 9/1952 | Kofoid | 198/491 |
| 3,235,101 | 2/1966 | Milhaupt | 198/492 |
| 3,584,726 | 6/1971 | Hartzell | 198/530 |
| 3,700,116 | 10/1972 | Rysti | 414/748 |
| 3,999,684 | 12/1976 | Kkholm | 198/530 |

Primary Examiner—Robert B. Reeves
Assistant Examiner—Brian Bond
Attorney, Agent, or Firm—Ladas & Parry

[57] ABSTRACT

A device for transferring logs one by one from an inlet side to an outlet side, comprising two pairs of disks, each pair comprising two disks supported on separate parallel shafts to carry out continuous reciprocating rotary movements in opposite directions. Each disk is provided with a peripheral notch which in the extreme positions of the rotary movement of the disks are directed toward said inlet side and said outlet side and in the intermediate position of said rotary movement form a common separating chute. Logs to be separated are fed to the notch of the inlet side disk in its said extreme position. A tilting lever is supported at one end of the shaft of the outlet side disk and connected at the opposite end to the inlet side disk in such a way that said tilting lever is raised in an inclined position into said separating chute in said intermediate position and thereby forces the log or logs positioned in said chute to roll from the notch of the inlet side disk towards the notch of the outlet side disk. The reciprocating rotary movement of said disks raises and lowers said tilting lever automatically without need of separate power means for tilting said lever.

3 Claims, 6 Drawing Figures

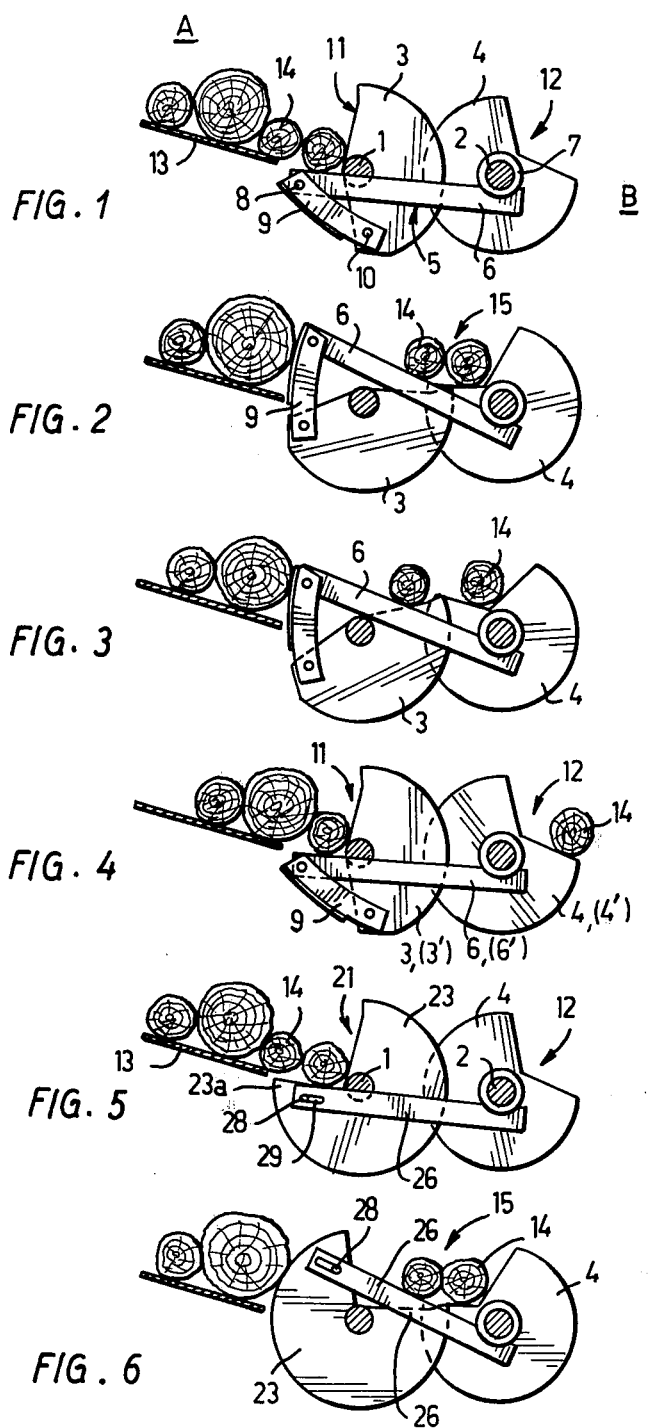

DEVICE FOR PORTIONING LOGS OR SIMILAR OBJECTS

This invention relates to a device for transferring logs or similar elongated objects one by one from an inlet side to an outlet side, comprising at least two pairs of disks, each pair comprising two disks rotating on separate shafts in opposite directions and being provided with peripheral notches which, in the extreme positions of the rotary movement of the disks, are directed substantially toward said inlet side and said outlet side, respectively, and which, in the intermediate position of the rotary movement of the disks, form a separating chute between the disks, and said device further comprising a transfer means which, in said intermediate position, displaces logs located in the separating chute toward the notch of the disk on the outlet side.

From the Finnish Patent Specification No. 42,932 is previously known a portioning device of this type. The ability of the device to separate logs from each other in order to feed through the device each particular time only one log at a time is based on the fact that, when a plurality of logs at the same time are fed into the separating chute formed by the disks, the overlapping tip portions of the notches in the disks penetrate in between the logs positioned in the separating chute when the disks start to rotate back to the initial positions so that each particular time only one log remains in the notch in the disk on the outlet side, while all other logs get back into the notch in the disk on the inlet side. In order to ensure that a log will always be transferred into the notch in the disk on the outlet side also in the event that the disk on the inlet side feeds only one log into the separating chute, the device is provided with a transfer means which pushes a log located in the separating shute toward the notch in the disk on the outlet side.

In the device described in said Patent Specification, the transfer means is shaped as a push lever which at one end thereof is pivotally journalled on the disk on the inlet side and which is connected to a driving means by means of which the push lever can be pivoted to a position in which it penetrates into the separating chute. The driving means usually comprises a pressure medium cylinder. Thus, the known device suffers from the disadvantage that each push lever requires a separate driving means of its own as well as a pressure medium source and conduits connected thereto. The push force of the push lever is, moreover, always of the same magnitude irrespective of the diameter and weight of the logs to be pushed in the chute. A further disadvantage is that the disks must for a short moment stop during the operation of the push lever in order to obtain a proper separation of the logs.

It is the object of the present invention to provide a feeding device which eliminates the above-mentioned disadvantages and permits a simplification of the operation of the transfer means. This object is achieved by means of the device according to the present invention which is characterized in that said transfer means comprises a tilting lever which extends between both disks of each pair of disks and is operated by the rotary movement of the disks so that said tilting lever rises into said separating chute between the disks when the disks are positioned in said intermediate position.

The invention is based on the idea of producing the movement of the transfer means directly by means of the rotary movement of the disks, whereby no separate driving means are required for moving the transfer means and the structure is thus simplified. The invention is, moreover, based on the idea of mounting the transfer means tiltable, whereby the transfer of a log or logs in the separating chute towards the notch in the disk on the outlet side takes place due to the rolling movement of the logs by their own weight. Because, in the device according to the invention, the transfer of logs can start already during the rotary movement of the disks and is finished when the disks reach their intermediate position, the disks can immediately start their return motion toward their initial position, which increases the operating rate of the device.

The invention will now be described in more detail with reference to the accompanying drawings, in which FIGS. 1 to 4 illustrate a preferred embodiment of a device according to the invention in the receiving position, transferring position, separating position and discharging position, respectively, and FIGS. 5 and 6 illustrate a second embodiment of the feeding device in the receiving position and transferring position, respectively.

The feeding device shown in FIGS. 1 to 4 of the drawings comprises two parallel rotary shafts 1,2 to which are attached at least two spaced-apart pairs of disks. One disk 3 in each pair of disks is rigidly attached to one shaft and the other disk 4 similarly to the other shaft. The rotary shafts are interconnected with means not shown, e.g., a toothed arc gearing so as to rotate synchronously in opposite directions in relation to each other. One of the shaft is connected to a driving means, such as a hydraulic cylinder, rotating said shaft back and forth.

The feeding device is also provided with a transfer means 5 comprising a tilting lever 6 which at one end is fixed to a bracket 7 pivotally journalled on the rotary shaft 2 of the disk 4 and at the other end is by means of a pivot shaft 8 journalled on a one end of a supporting arm 9. Said supporting arm is at its opposite end attached to the other disk 3 by means of pivot shaft 10.

Each disk is provided with peripheral notches 11 and 12, respectively, whereby said tilting lever forms one flank of the notch 11 of the first disk 3.

On the inlet side of the feeding device is arranged an inclined surface 13 feeding logs 14 to be portioned to the feeding device.

The disks are mounted in relation to each other such that, while the disks are positioned in the receiving and discharging positions shown in FIGS. 1 and 2 respectively, the notches in the disks are oriented substantially in oppoiste directions, i.e. the notch 11 of the disk 3 is directed toward the surface 13, that is toward the inlet side A for logs and the notch 12 of the disk 4 is directed toward the log outlet side B, and after the disks have turned to the transferring and separating positions shown in FIGS. 2 and 3 respectively, the notches of the disks form a common separating chute 15. The tilting lever 6 is so arranged in relation to the disks that, while the disks are positioned in the position shown in FIG. 1, the lever is nearly horizontal and, as the disks rotate to the tranferring position shown in FIG. 2, the lever will rise a position inclined toward the outlet side B.

The feeding device operates as follows:

With the disks located in the receiving position shown in FIG. 1, one or more logs roll from the surface 13 into the notch 11 of the disk 3 on the inlet side. As the disks rotate toward the transfer position shown in FIG. 2, the tilting lever 6 rises and, in the inclined position, enters into the separating chute 15 formed by the notches so that the logs in the chute, by their own weight, roll along the lever toward the notch 12 of the disk 4 on the outlet side. As the disks change their direction of rotation and start to move toward their initial positions, the overlapping tip portions of the disks penetrate in the manner shown in FIG. 3 in between the logs positioned in the separating chute so that the logs are separated and only one log remains in the notch 12 of the disk on the outlet side. When the disks have rotated back to their discharging position shown in FIG. 4, the separated log falls out from the notch 12 of the disk 4 on the outlet side. The supporting arm 9 of the tilting lever acts as a stop preventing logs on the surface 13 from moving downward along the surface except when the tilting lever is in the downturned position according to FIG. 4.

It is noted that the own rotary movement of the disks produces the movements of the tilting lever, so that no separate driving means is required therefor. It is also noted that the transfer of the logs positioned in the separating chute takes place by means of the sliding and rolling movement of the logs.

The embodiment shown in FIGS. 5 and 6 differs from the preceding one only that the transfer means 25 comprises only a tilting lever 26 which is fixed to tip 23a of one flank of the notch 21 of the disk 23 on the inlet side by means of a pivot shaft 28 slidable in a notch 29 in the tilting lever. Thus, the supporting arm according to the preceding embodiment has been omitted.

The drawings and specification relating thereto are only intended to illustrate the idea of the invention. Thus, also other types of mechanisms may be contemplated for producing the rising and lowering movement of the lever 6 and 26, respectively, under the action of the rotary movement of the disks. Instead of producing the movements by means of the rotary movement of the disk on the inlet side, the movements can also be produced by means of the rotary movement of the disk on the outlet side, in which case the anticlockwise movement of the disk is by means of any suitable gearing means changed into a corresponding clockwise movement of the tilting lever. Instead of mounting the tilting lever on the shaft of the disk on the outlet side, the lever can be supported on a bracket fixed in another location.

As pointed out above the disks 3 and 4 co-operate with a second pair of disks which are fastened on the shafts 1 and 2 at an axial distance from the disks 3 and 4 and which are of shape identical with the shape of the disks 3, 4. The disks of said second pair are positioned on the shafts and operate in an identical manner as described above with reference to said disks 3 and 4. In the same manner the disks of the second pair are also provided with a tilting lever quite identical with the lever 6 described above. In the views illustrated in FIGS. 1–4 the disks and the lever of the second pair are positioned behind the disks 3,4 and the lever 6 of the first pair as has been illustrated with the reference numerals 3', 4' and 6', respectively in FIG. 4.

What I claim is:

1. A device for transferring logs or similar elongated objects one by one from an inlet side (A) to an outlet side (B), comprising at least two pairs of disks, each pair comprising two disks (3,4;23,4) rotating on separate shafts (1,2) in opposite directions and provided with peripheral notches (11,12;12) which, in the extreme positions of the rotary movement of the disks, are directed substantially toward said inlet side and said outlet side, respectively, and which, in the intermediate position of the rotary movement of the disks, form a separating chute (15) between said disks, and said device further comprising a transfer means (5;25) which, in said intermediate position, displaces logs (14) located in the separating chute toward the notch (12) of the disk on the outlet side, characterized in that said transfer means (5;15) comprises a tilting lever (6;26) which extends between both disks (3,4;23,4) of each pair of disks and is operated by the rotary movement of the disks so that said tilting lever rises into said separating chute (15) between the disks when the disks are positioned in said intermediate position.

2. A device as claimed in claim 1, wherein said tilting lever (6) is at one end pivotally journalled on the rotary shaft (2) of the disk (4) on the outlet side (B) and at the other end hingedly fixed through a connecting arm (9) to the disk on the inlet side (A) so that the tilting lever, in said exteme positions of the disks, forms a log-receiving support flank of the notch (11) of the disk (3) on the inlet side and the connecting arm (9), in said intermediate position of the disks, forms a log-retaining stop for the disk (3) on the inlet side.

3. A device as claimed in claim 1, wherein said tilting lever (26) is at one end pivotally journalled on the rotary shaft (2) of the disk (4) on the outlet side (B) and at the other end hingedly fixed to the tip (23a) of the flank of the notch (21) of the disk (23) on the inlet side (A).

* * * * *